US012804483B2

(12) United States Patent
Elmali et al.

(10) Patent No.: US 12,804,483 B2
(45) Date of Patent: Nov. 17, 2026

(54) NETWORK SLICE SUPPORT INDICATION TO ASSIST PRIMARY SECONDARY CELL CHANGES

(71) Applicant: Nokia Technologies Oy, Espoo (FI)

(72) Inventors: Ugur Baran Elmali, Munich (DE); Muhammad Naseer-Ul-Islam, Munich (DE); Krzysztof Kordybach, Wrocław (PL); Arled Papa, Munich (DE); Ömer Bulakci, Munich (DE); Ahmad Awada, Munich (DE)

(73) Assignee: Nokia Technologies Oy, Espoo (FI)

( * ) Notice: Subject to any disclaimer, the term of this patent is extended or adjusted under 35 U.S.C. 154(b) by 275 days.

(21) Appl. No.: 18/790,497

(22) Filed: Jul. 31, 2024

(65) Prior Publication Data

US 2025/0048199 A1 Feb. 6, 2025

(30) Foreign Application Priority Data

Aug. 4, 2023 (GB) ..................................... 2311960

(51) Int. Cl.

*H04W 36/00* (2009.01)
*H04W 28/20* (2009.01)
*H04W 76/15* (2018.01)

(52) U.S. Cl.

CPC ....... *H04W 36/0069* (2018.08); *H04W 28/20* (2013.01); *H04W 36/0061* (2013.01); *H04W 36/00835* (2018.08); *H04W 76/15* (2018.02)

(58) Field of Classification Search

CPC ....... H04W 36/0069; H04W 36/00835; H04W 28/20; H04W 36/0061; H04W 76/15
See application file for complete search history.

(56) References Cited

U.S. PATENT DOCUMENTS

2020/0305054 A1 9/2020 Zee et al.

FOREIGN PATENT DOCUMENTS

EP 3989665 A1 4/2022
WO 2018219352 A1 12/2018
WO 2020222093 A1 11/2020
WO 2023011821 A1 2/2023
(Continued)

OTHER PUBLICATIONS

Search Report, dated Jan. 26, 2024, by the UK Intellectual Property Office, in Application No. GB2311960.5, 2 pages.
(Continued)

*Primary Examiner* — James P Duffy
(74) *Attorney, Agent, or Firm* — Barta Jones, PLLC

(57) ABSTRACT

A master node is provided for a user equipment operating in dual-connectivity with the master node and a secondary node. The master node may be configured to receive information that indicates supported network slices of one or more further nodes. The master node may be configured to transmit slice support information for the one or more further nodes, based on the information. The slice support information may indicate one or more of the supported network slices, at least one non-supported network slice of the one or more further nodes, or at least one communication session of the user equipment that is associated with at least one non-supported network slice. The secondary node may receive the slice support information, and make a secondary node change determination at the secondary node, based on the slice support information.

20 Claims, 12 Drawing Sheets

(56) References Cited

FOREIGN PATENT DOCUMENTS

WO 2023131404 A1 7/2023

OTHER PUBLICATIONS

3GPP TSG-RAN WG3 #97 R3-173144, CMCC, "Slice Impact on Multi-Connectivity", Berlin, Germany, Aug. 21, 210217-Aug. 25, 2017, XP051319975, 3 pages.
"3rd Generation Partnership Project; Technical Specification Group Services and System Aspects; System architecture for the 5G System (5GS); Stage 2 (Release 18)", 3GPP TS 23.501 V18.2.2, Jul. 2023, pp. 1-694.
"3rd Generation Partnership Project; Technical Specification Group Core Network and Terminals; Numbering, addressing and identification; (Release 18)", 3GPP TS 23.003 V18.2.0, Jun. 2023, pp. 1-155.
"3rd Generation Partnership Project; Technical Specification Group Radio Access Network; NR; NR and NG-RAN Overall Description, Stage 2 (Release 16)", 3GPP TS 38.300 V16.13.0, Jun. 2023, pp. 1-152.
"IEEE 802.11", Wikipedia, Retrieved on Jul. 4, 2025, Webpage available at: https://en.wikipedia.org/wiki/IEEE_802.11.
"IEEE 802.15", Wikipedia, Retrieved on Jul. 4, 2025, Webpage available at: https://en.wikipedia.org/wiki/IEEE_802.15.
"3rd Generation Partnership Project; Technical Specification Group Radio Access Network; NG-RAN; Xn application protocol (XnAP) (Release 17)", 3GPP TS 38.423 V17.5.0, Jun. 2023, pp. 1-588.
"3rd Generation Partnership Project; Technical Specification Group Radio Access Network; Evolved Universal Terrestrial Radio Access (E-UTRA) and NR; Multi-connectivity; Stage 2 (Release 17)", 3GPP TS 37.340 V17.5.0, Jun. 2023, pp. 1-120.
"3rd Generation Partnership Project; Technical Specification Group Radio Access Network; NR; NR and NG-RAN Overall Description; Stage 2 (Release 17)", 3GPP TS 38.300 V17.5.0, Jun. 2023, pp. 1-211.
Extended European Search Report received for corresponding European Patent Application No. 24172670.2, dated Oct. 16, 2024, 10 pages.
"The slice availability for SN change procedure", 3GPP TSG-RAN WG3 Meeting #121-bis, R3-235159, Nokia, Oct. 9-13, 2023, 25 pages.

NETWORK SLICE SUPPORT INDICATION TO ASSIST PRIMARY SECONDARY CELL CHANGES

TECHNOLOGICAL FIELD

The present disclosure relates generally to telecommunications and, in particular, to dual connectivity of a user equipment in a telecommunications system.

BACKGROUND

A telecommunications system can be seen as a facility that enables communication sessions between two or more entities such as user terminals, base stations and/or other nodes by providing carriers between the various entities involved in the communications path. A telecommunications system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless telecommunications system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the telecommunications system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The telecommunications system and associated devices typically operate in accordance with a given standard or specification which sets out what the various entities associated with the system are permitted to do and how that should be achieved. Communication protocols and/or parameters which shall be used for the connection are also typically defined. One example of a telecommunications system is the Universal Mobile Telecommunications System (UMTS). Other examples of telecommunications systems are Long-Term Evolution (LTE), LTE Advanced and the so-called 5G or New Radio (NR) networks. NR is being standardized by the 3rd Generation Partnership Project (3GPP).

BRIEF SUMMARY

Example implementations of the present disclosure are directed to telecommunications and, in particular, to dual connectivity of a user equipment in a telecommunications system in which the user equipment may be connected to a master node and a secondary node. In this regard, the present disclosure includes, without limitation, the following example implementations.

Some example implementations provide an apparatus comprising: at least one memory configured to store computer-readable program code to implement a master node for a user equipment operating in dual-connectivity with the master node and a secondary node; and at least one processing circuitry configured to access the at least one memory, and execute the computer-readable program code to cause the apparatus to at least: receive information that indicates supported network slices of one or more further nodes; and transmit slice support information for the one or more further nodes, to the secondary node, based on the information.

Some example implementations provide an apparatus comprising: means for receiving, at a master node for a user equipment operating in dual-connectivity with the master node and a secondary node, information that indicates supported network slices of one or more further nodes; and means for transmitting slice support information for the one or more further nodes, from the master node to the secondary node, based on the information.

Some example implementations provide an apparatus comprising: at least one memory configured to store computer-readable program code to implement a secondary node for a user equipment operating in dual-connectivity with a master node and the secondary node; and at least one processing circuitry configured to access the at least one memory, and execute the computer-readable program code to cause the apparatus to at least: receive, from the master node, slice support information for one or more further nodes; and make a secondary node change determination at the secondary node, based on the slice support information.

Some example implementations provide an apparatus comprising: means for receiving, at a secondary node from a master node for a user equipment operating in dual-connectivity with the master node and the secondary node, slice support information for one or more further nodes; and means for making a secondary node change determination at the secondary node, based on the slice support information.

Some example implementations provide a method comprising: receiving, at a master node for a user equipment operating in dual-connectivity with the master node and a secondary node, information that indicates supported network slices of one or more further nodes; and transmitting slice support information for the one or more further nodes, from the master node to the secondary node, based on the information.

Some example implementations provide a method comprising: receiving, at a secondary node from a master node for a user equipment operating in dual-connectivity with the master node and the secondary node, slice support information for one or more further nodes; and making a secondary node change determination at the secondary node, based on the slice support information.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
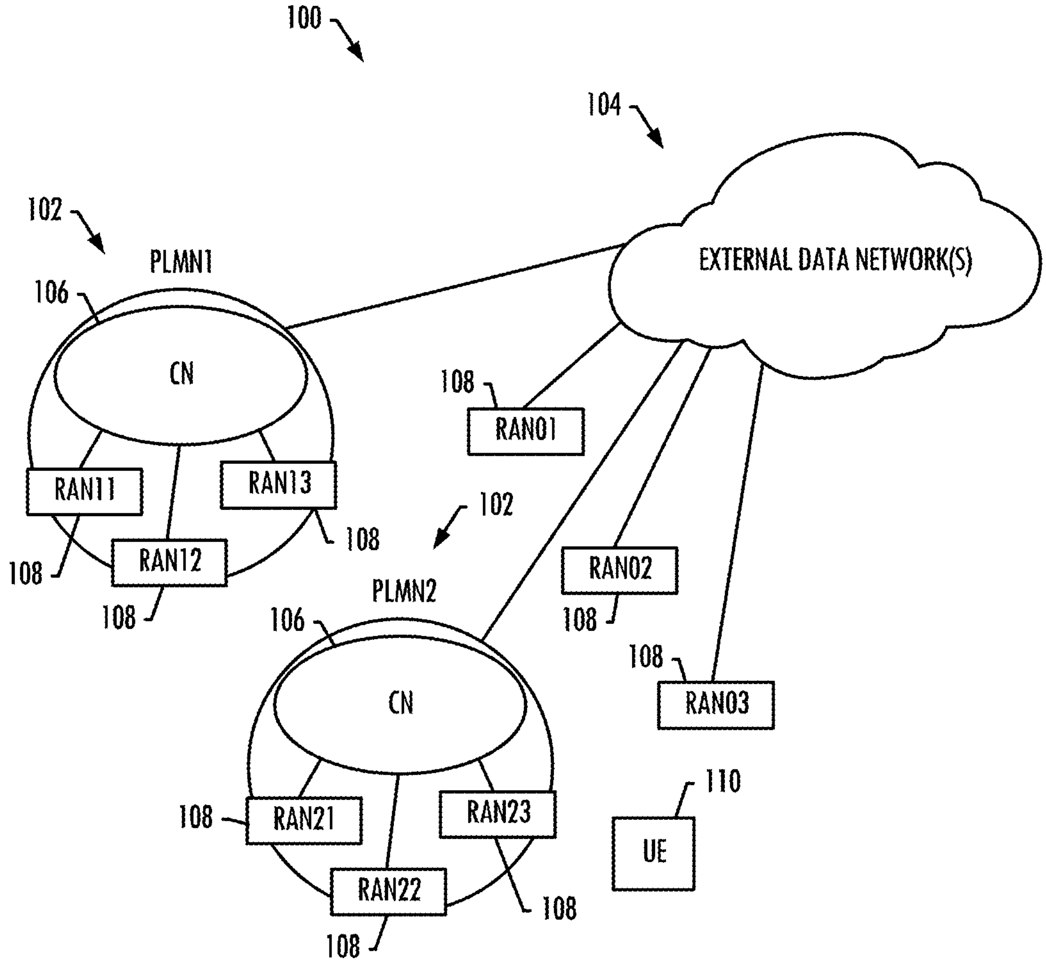
FIG. 1 illustrates a telecommunications system that includes one or more public land mobile networks (PLMNs) coupled to one or more external data networks, according to some example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably. The term "network" may refer to a group of interconnected computers including clients and servers; and within a network, these computers may be interconnected directly or indirectly by various means including via one or more switches, routers, gateways, access points or the like.

Reference may be made herein to terms specific to a particular system, architecture or the like, but it should be understood that example implementations of the present disclosure may be equally applicable to any of a number of systems, architectures and the like. For example, reference may be made to 3GPP technologies such as Global System for Mobile Communications (GSM), UMTS, LTE, LTE Advanced and 5G NR; however, it should be understood that example implementations of the present disclosure may be equally applicable to non-3GPP technologies such as IEEE 802, Bluetooth and Bluetooth Low Energy.

Further, as used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); or (c) hardware circuit (s) and/or processor(s), such as a microprocessor(s) or a portion of a microprocessor(s), that requires software (e.g., firmware) for operation, but the software may not be present when it is not needed for operation.

The above definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

FIG. 1 illustrates a telecommunications system 100 according to various example implementations of the present disclosure. The telecommunications system generally includes one or more telecommunications networks. As shown, for example, the system includes one or more public land mobile networks (PLMNs) 102 coupled to one or more other external data networks 104—notably including a wide area network (WAN) such as the Internet. Each of the PLMNs includes a core network (CN) 106 backbone such as the Evolved Packet Core (EPC) of LTE, the 5G core network (5GC) or the like; and each of the core networks and the Internet are coupled to one or more radio access networks (RANs) 108, air interfaces or the like that implement one or more radio access technologies (RATs). As used herein, a "network device" refers to any suitable device at a network side of a telecommunications network. Examples of suitable network devices are described in greater detail below.

In addition, the system includes one or more radio units that may be varyingly known as user equipment (UE) 110, terminal device, terminal equipment, mobile station or the like. The UE is generally a device configured to communicate with a network device or a further UE in a telecommunication network. The UE may be a portable computer (e.g., laptop, notebook, tablet computer), mobile phone (e.g., cell phone, smartphone), wearable computer (e.g., smartwatch), or the like. In other examples, the UE may be an Internet of things (IoT) device, an industrial IoT (IIoT device), a vehicle equipped with a vehicle-to-everything (V2X) communication technology, or the like. In operation, these UEs may be configured to connect to one or more of the RANs 108 according to their particular radio access technologies to thereby access a particular core network of a PLMN 102, or to access one or more of the external data networks 104 (e.g., the Internet). The external data network may be configured to provide Internet access, operator services, 3rd party services, etc. For example, the International Telecommunication Union (ITU) has classified 5G mobile network services into three categories: enhanced mobile broadband (eMBB), ultra-reliable and low-latency communications (URLLC), and massive machine type communications (mMTC) or massive internet of things (MIoT).

Examples of radio access technologies include 3GPP radio access technologies such as GSM, UMTS, LTE, LTE Advanced, and 5G NR. Other examples of radio access technologies include IEEE 802 technologies such as IEEE 802.11 (Wi-Fi), IEEE 802.15 (including 802.15.1 (WPAN/Bluetooth), 802.15.4 (Zigbee) and 802.15.6 (WBAN)), Bluetooth, Bluetooth Low Energy (BLE), ultra wideband (UWB), and the like. Generally, a radio access technology may refer to any 2G, 3G, 4G, 5G or higher generation mobile communication technology and their different versions, as well as to any other wireless radio access technology that may be arranged to interwork with such a mobile communication technology to provide access to the core network of a mobile network operator (MNO).

In various example, a RAN 108 may be configured as one or more macrocells, microcells, picocells, femtocells or the like. The RAN may generally include one or more radio access nodes that are configured to interact with UEs 110. In various examples, a radio access node may be referred to as a base station (BS), access point (AP), base transceiver station (BTS), Node B (NB), evolved NB (eNB), macro BS, NB (MNB) or eNB (MeNB), home BS, NB (HNB) or eNB (HeNB), next generation NB (gNB), next generation eNB (ng-eNB), or the like. Some type of network controlling/governing entity responsible for control of the radio access nodes. The network controlling/governing entity and radio access node may be separate or integrated into a single apparatus. The network controlling/governing entity may include processing circuitry configured to carry out various management functions, etc. The processing circuitry may be associated with a computer-readable storage medium or database for maintaining information required in the management functions.

A RAN 108 may be centralized or distributed. In various examples, components of a RAN may be interconnected by Ethernet, Gigabit Ethernet, Asynchronous Transfer Mode (ATM), optical fiber, dark fiber, passive wavelength division multiplexing (WDM), WDM passive optical network (WDM-PON), optical transport network (OTN), time sensitive networking (TSN) and/or any other data link layer network, possibly including radio links. The RAN may be connected to a CN 106 through one or more gateways, network functions or the like.

As will be appreciated, a PLMN 102 may be deployed in a number of different manners. In a 4G LTE deployment, the EPC 202 is the CN 106, and the evolved UMTS terrestrial radio access network (E-UTRAN) 204 is the RAN 108; and the E-UTRAN includes one or more eNBs (radio access nodes) configured connect UEs 110 to the E-UTRAN to thereby access the EPC. Similarly, in a 5G deployment, the 5GC is the CN, and the next generation (NG) radio access network (NG-RAN) is the RAN; and the NG-RAN includes one or more gNBs (radio access nodes) configured connect UEs to the NG-RAN to thereby access the 5GC. The term 'gNB' in 5G may correspond to the eNB in 4G LTE. These are considered standalone (SA) deployments of 4G LTE and 5G. Other deployments combine 4G LTE and 5G technologies, and are referred to as non-standalone (NSA) deployments. In some deployments, the E-UTRAN includes one or more ng-eNBs that are configured to communicate with the 5GC, and that may also be configured to communicate with one or more gNBs. Similarly, in another deployment, the NG-RAN may include one or more en-gNBs that are configured to communicate with the EPC, and that may also be configured to communicate with one or more eNBs.

In radio communications, node operations may in be carried out, at least partly, in a central/centralized unit (CU), such as a server, host or node, operationally coupled to a distributed unit (DU), such as a radio head/node. It is also possible that node operations may be distributed among a plurality of servers, hosts or nodes. It should also be understood that the distribution of work between CN 106 operations and radio access node (RAN 108) operations may vary depending on implementation. Thus, a 5G network architecture may be based on a so-called CU-DU split. One gNB-CU (central node) may control one or more gNB-DUs. The gNB-CU may control a plurality of spatially separated gNB-DUs, acting at least as transmit/receive (Tx/Rx) nodes. In some example implementations, however, the gNB-DUs (also called DU) may include, for example, a radio link control (RLC), medium access control (MAC) layer and a physical (PHY) layer, whereas the gNB-CU (also called a CU) may include the layers above the RLC layer, such as a packet data convergence protocol (PDCP) layer, a radio resource control (RRC), and an internet protocol (IP) layer. Other functional splits are also possible. It is considered that skilled person is familiar with the OSI model and the functionalities within each layer.

In some example implementations, the server or CU may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU, and the boundary where the responsibility is shifted between the CU and the DU may be selected according to implementation.

In various instances, a single UE 110, a dual-mode or multimode UE, may support multiple (two or more)

RANs—thereby being configured to connect to multiple RANs. For example, a particular UE may support both LTE and 5G NR radio access technologies. In this regard, a number of deployments support dual connectivity (DC), and in some particular examples multi-radio dual connectivity (MR-DC), in which a UE may be configured to connect to two different radio access nodes connected via a non-ideal backhaul, one of the radio access nodes providing NR access and the other radio access node providing either E-UTRA or NR access. In these deployments, one radio access node may act as a master node (MN) and the other may act as a secondary node (SN). The MN functions as the controlling entity that provides control plane connection to the CN 106, and utilizes the SN for additional resources to the UE. Related to dual connectivity, a secondary cell group (SCG) refers to a group of serving cells associated with the SN, and the SCG includes primary cell referred to as the primary secondary cell (PSCell).

E-UTRAN supports dual connectivity via E-UTRA-NR dual connectivity (EN-DC), in which a UE is connected to one eNB that acts as a MN and one en-gNB that acts as a SN. NG-RAN supports dual connectivity in a number of different manners. In NG-RAN E-UTRA-NR dual connectivity (NGEN-DC), a UE is connected to one ng-eNB that acts as a MN and one gNB that acts as a SN. In NR-E-UTRA dual connectivity (NE-DC), a UE is connected to one gNB that acts as a MN and one ng-eNB that acts as a SN. And in NR-NR dual connectivity (NR-DC), a UE is connected to one gNB that acts as a MN and another gNB that acts as a SN.

Figure 2:
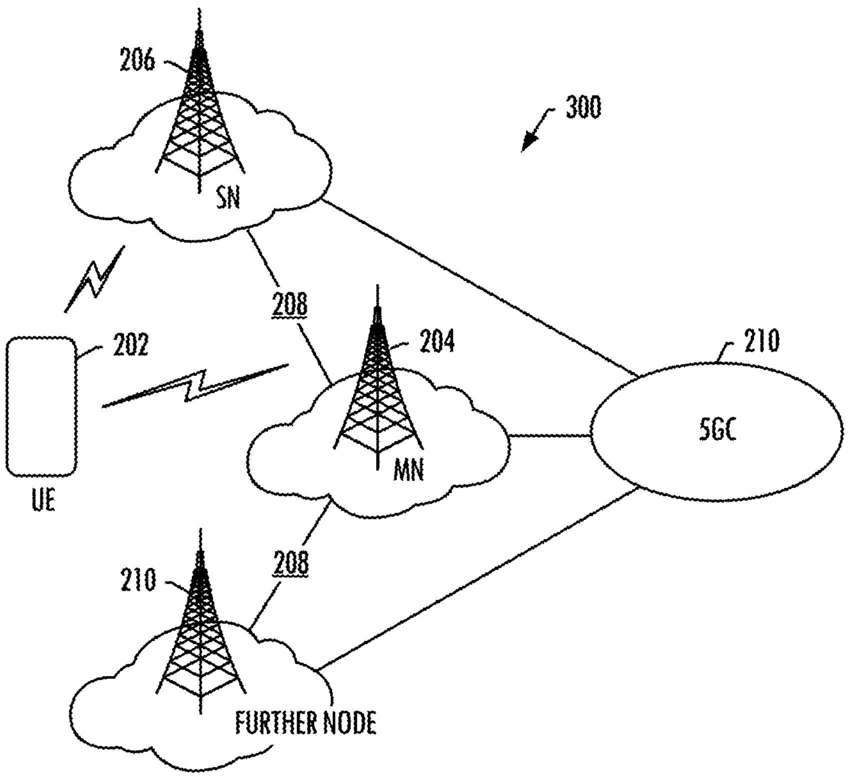
FIG. 2 illustrates an example of dual connectivity with the 5G core network, including a user equipment (UE), master node (MN) and secondary node (SN), according to some example implementations.

FIG. 2 illustrates an example of dual connectivity with the 5GC, according to some example implementations. More particularly, FIG. 2 illustrates a deployment 200 including a UE 202 connected to a MN 204 and a SN 206, one of which provides NR access and the other of which provides either E-UTRA or NR access. The MN and SN are connected via a network interface 208, such as an Xn interface, and at least the MN is connected to the 5GC 210. More information regarding the Xn interface in particular may be found in 3GPP Technical Specification (TS) 38.423: "NG-RAN; Xn Application Protocol (XnAP) (Release 17)," v.17.5.0 (2023 June).

When a UE 202 registers to the 5GC 210, the UE can communicate with an external data network via one or more communication sessions, referred to in 5G NR as packet data unit (PDU) sessions, which are data paths established from the UE through the 5GC to the external data network. In the case of dual connectivity, these communication sessions may be served by the MN 204 and SN 206. In some examples, then, the MN may be referred to as a serving MN, and the SN may be referred to as a serving SN.

Figure 3:
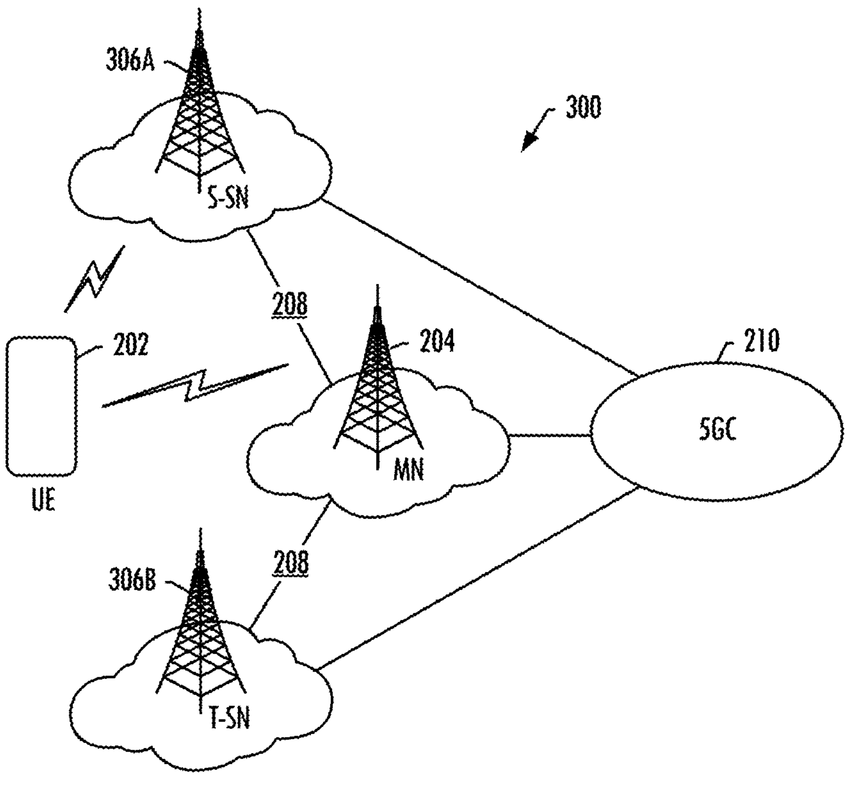
FIG. 3 illustrates an SN-initiated SN change procedure between the UE, the MN, the SN as a source secondary node (S-SN), and a target SN (T-SN), according to some example implementations.

Based on several inputs taken into account such as measurements from the UE 202, a PSCell change can be triggered by the MN 204 or the SN 206. The former may be referred to as an MN-initiated PSCell change, whereas the latter may be referred to as an SN-initiated PSCell change. As shown in FIG. 3, for example, an SN-initiated SN change procedure may be used to transfer a UE context from a source SN (S-SN) 306A to a target SN (T-SN) 306B, and to change the SCG configuration in the UE from the S-SN to the T-SN. As also shown in FIG. 3, similar to the S-SN, the MN and T-SN may be connected via a network interface 208 (e.g., Xn interface).

Furthermore, an SN-initiated conditional SN change procedure may be used for inter-SN conditional PSCell change (CPC) configuration and inter-SN CPC execution. The SN-initiated conditional SN change procedure may also be initiated by the S-SN 306A, to modify the existing SN initiated inter-SN CPC configuration, or to trigger the release of a candidate (target) SN by cancellation of all the prepared PSCells at the candidate SN and releasing the CPC related UE context at the candidate SN. More information regarding various SN change procedures may be found in 3GPP TS 37.340: "Evolved Universal Terrestrial Radio Access (E-UTRA) and NR; Multi-connectivity; Stage-2 (Release 17)," v.17.5.0 (2023 June).

Briefly returning to FIG. 2, 5G NR also supports network slices, which are end-to-end logical networks that support a certain set of network functions. As such, a network slice is a logical network infrastructure which provides specific network capabilities and network characteristics. Across a 5G NR network, comprising a plurality of network slices, particular network slices may be configured to support particular features (e.g., hardware specifications, network functions, domain access, etc.) that are not common to all network slices. A UE 202 may be configured to access multiple network slices over a MN 204 and SN 206, and communication session(s) of the UE may be established in these network slices. As used herein, the terms "network slice," "slice," and similar terms may be used interchangeably to refer to an end-to-end logical communication network, or portion thereof, within a PLMN or another network.

Network slicing incorporates the concept of allowing differentiated treatment of UEs dependent on each customer's particular requirements. Thus, network slicing makes it possible for MNOs to consider customers as belonging to different tenant types with each tenant type having respective service requirements. The service requirements of a particular tenant group are governed in accordance with respect to the network slice types associated with each tenant type. A UE belonging to a particular tenant type is eligible to use network slices specified according to their respective service level agreement (SLA) and subscriptions.

Network slices may be configured to differ either in their service requirements, such as eMBB or URLLC, or via the tenant that provides those particular services. Network slice support may be assumed to be uniform in a tracking area (TA) such that all the cells in a TA have the same network slice support. A registration area (RA) is a list of TAs that support the same network slices from a UE perspective. When a UE registers to the 5GC, the UE may indicate the network slices for access via requested single network slice selection assistance information (S-NSSAI), which uniquely identifies a network slice. Current 3GPP specifications allow a UE to be simultaneously connected and served by at most eight network slices associated with eight S-NSSAIs. On other hand, each cell may support tens or even hundreds of S-NSSAIs. In the current specifications, a TA may have a support up to 1024 network slices. More information regarding network slicing may be found in 3GPP TS 38.300: "NR; NR and NG-RAN Overall Description; Stage 2 (Release 17)," v.17.5.0 (2023 June).

As explained above, a serving SN 206 (which is a S-SN 306A for a PSCell/SN change) may initiate an inter-SN PSCell change (SN change) based on measurements received from the UE 202, which may indicate a better possible radio connectivity with another cell of another radio access node. The SN may either trigger an SN change procedure or a conditional SN change procedure.

For an SN change procedure, the message sent from the S-SN 306A to the MN 204 to initiate an SN change may identify a T-SN 306B so that the MN may contact and prepare the T-SN. For a conditional SN change procedure, S-SN may identify multiple T-SNs (at times referred to as candidate T-SNs, or more simply candidate SNs). In both type of SN change procedures, the S-SN may receive a SN change confirm message that identifies communication sessions of the UE 202 that are to be served by the prepared T-SN (handed over from the S-SN to the T-SN). For a conditional SN change procedure, the communication sessions may be identified for each of the prepared T-SNs. As described herein, unless otherwise indicated, reference to a "SN change procedure" may refer to a SN change procedure or a conditional SN change procedure.

When a T-SN 306B is prepared, MN 204 may request the T-SN allocate resources for communication sessions (e.g., PDU sessions) of the UE 202. When the communication sessions are associated with network slices, the T-SN may perform a slice-aware admission control to determine if the network slices are supported by the T-SN. And if any of the communication sessions are associated with non-supported network slices, the T-SN may reject or otherwise not admit those communication sessions. In this case, the MN may take over or drop the rejected communication sessions, depending on the MN's availability, e.g., congestion. The SN change confirm message received by the S-SN 306A, however, does not identify the rejected/not admitted communication sessions, since those communication sessions will not be served by the T-SN. The S-SN therefore may not know why some communication sessions of the UE are rejected by the T-SN.

Furthermore, a radio access node (whether it is MN 204 or SN 206) may aim for maximum continuity of the ongoing communication sessions of a UE 202 during handover decisions. It may therefore be desirable for the T-SN 306B to support the network slices in which those communication sessions are established. Given knowledge of the slice support of its neighbors, a S-SN 306A in a handover decision may prioritize those of its neighbors that support the network slices of the UE's ongoing communication sessions. In case of single-connectivity, neighboring nodes are informed of each other's slice support over a network interface (e.g., Xn interface) that connects the nodes. In case of dual connectivity, there is no guarantee that the S-SN and T-SN are connected by a network interface; and therefore, there is no guarantee that the S-SN is informed of the slice support of a T-SN. Consequently, SN-initiated SN change decisions may not be optimally performed by a S-SN, as the S-SN may lack information about the slice support of a T-SN.

In view of the foregoing, and returning to FIG. 2, example implementations of the present disclosure provide a mechanism to provide a SN 206 with information that indicates network slice support of one or more further nodes 210 (radio access nodes), to assist the SN in decisions for SN-initiated SN changes. In this regard, SN-initiated SN change decisions may become more efficient and successful, with fewer communication sessions (e.g., PDU sessions) of the UE 202 being rejected by a selected T-SN. This may also, in turn, lead to fewer communication sessions needing takeover by the MN 204. The UE may therefore receive better service, with fewer interruptions.

Some example implementations of the present disclosure provide a MN 204 for a UE 202 operating in dual-connectivity with the MN and a SN 206. The MN may be configured to receive information that indicates supported network slices of one or more further nodes 210, which may include one or more T-SNs 306B in a SN change procedure. In some examples, the MN is configured to receive this information during setup of a network interface 208 (e.g., Xn interface) between the MN and respective ones of the further node(s). The MN may be configured to transmit slice support information for the further node(s), to the SN, based on the information. In some examples including multiple further nodes, the MN may transmit slice support information for each of the multiple further nodes. The SN may then be configured to make a SN change determination, such as whether or not to initiate or proceed with a SN change procedure in which the SN is a S-SN 306A, and the further node(s) include T-SN(s), based on the slice support information of the T-SN(s).

In various example implementations, the slice support information may identify the supported slices (e.g., S-NSSAI) of the further node(s) 210. Additionally or alternatively, the slice support information may identify one or more non-supported slices of the further node(s). In some examples including multiple further nodes, the slice support information may indicate the supported network slices/non-supported network slice(s) for each of the multiple further nodes.

In some examples, the MN 204 is configured to determine at least one communication session (e.g., PDU session) of the UE 202 that is associated with at least one non-supported network slice of the further node(s) 210, based on the supported network slices. In some of these examples, the slice support information indicates the non-supported network slice(s). In particular, for example, the slice support information may identify the non-supported network slice (s), such as by S-NSSAI. Additionally or alternatively, the slice support information may identify the communication session(s), such as by PDU session ID(s) in the case of PDU sessions. In this regard, the communication session(s) may include session parameters, and the session parameters include respective S-NSSAI that identify the non-supported network slice(s).

In some example implementations, the slice support information is transmitted during a SN change procedure in which the SN 206 is a S-SN 306A, and the further node(s) 210 include T-SN(s) 306B. During the SN change procedure, the MN 204 may be configured to receive a SN change required message from the S-SN that identifies the T-SN(s). The MN may determine at least one communication session of the UE 202 that is associated with at least one non-supported network slice of the T-SN(s), based on the supported network slices. The MN may then transmit a SN change confirm message that includes the slice support information, and the slice support information may indicate the non-supported network slice(s).

In some of the above examples, the communication session(s) associated with the non-supported network slice (s) is rejected by the T-SN(s) 306B, and the slice support information identifies the communication session(s) rejected by the T-SN(s). In some further examples, the SN change confirm message may further indicate a cause of rejection of the communication session(s), and/or an action taken by the MN 204 for the communication session(s) rejected by the T-SN(s). In the case of an action taken, the MN may take an action such as to take over or drop the communication session(s) rejected by the T-SN(s). But the MN may otherwise continue with the SN change procedure, without the T-SN(s) serving the rejected communication session(s).

In other examples, the MN 204 may refuse a SN change requested by the S-SN 306A. In this regard, the MN may receive a SN change required message from the S-SN 306A identifying the T-SN(s) 306B, and determine communication session(s) of the UE 202 that is associated with non-supported network slice(s) of the T-SN(s), based on the supported network slices. The MN may decide to refuse the SN change based on the non-supported network slice(s) and thereby rejected communication session(s). The MN may then transmit a SN change refuse message that includes the slice support information, and the slice support information may indicate the non-supported network slice(s). In this regard, the slice support information may identify communication session(s) rejected by the T-SN(s), associated with the non-supported network slice(s), and optionally also the cause of rejection of the communication session(s).

As indicated above, network slice support may be assumed to be uniform in a TA such that all the cells in a TA have the same network slice support. In some examples, then, the supported network slices of the further node(s) 210 may be the supported network slices of a TA of a cell(s) served by the further node(s). In some of these examples, the slice support information may indicate the supported and/or not-supported network slices. The supported and/or not-supported network slices may be indicated by at least one of the T-SN or the TA.

In some examples, during an earlier setup of the network interface 208 (e.g., Xn) interface between the MN 204 and SN 206, the MN may receive a network interface setup request message the SN that includes neighbor cell information indicating TAs of neighboring cells of one or more cells served by the SN. The MN may make a first determination that the SN is unaware of the TA of a cell served by the further node(s) 210, and thereby unaware of the supported network slices of the further node(s), such as based on the TAs in the neighbor cell information excluding the TA of the cell served by the further node(s) 210.

The MN 204 may then make a second determination that the further node(s) 210 is a neighbor of the SN 206, such as based on one or more of operations and management (OAM) configuration, measurements received from one or more UEs 202, or previous history information of the UE(s). The MN may then transmit the slice support information based on the first determination and the second determination. In some examples, the slice support information is transmitted in a network interface setup response message. In other examples, the the slice support information may be transmitted in a network interface configuration update message.

Example implementations of the present disclosure described above from the perspective of the MN 204 apply equally to the SN 206. In this regard, information or messages that are from the perspective of the MN, received from or transmitted to the SN, may instead be from the perspective of the SN, transmitted to or received from the MN.

Example implementations of the present disclosure therefore also provide a SN 206 for a UE 202 operating in dual-connectivity with a MN 204 and the SN. In some of these example implementations, the SN may receive, from the MN, slice support information for one or more further nodes 210. The slice support information may be received during an earlier SN change procedure initiated at the SN (as a S-SN 306A), such as in a manner described above. The SN may then make a SN change determination based on the slice support information received from the MN, such as whether or not to initiate or proceed with a SN change procedure. During this SN change procedure, the SN (again as S-SN) may select the further node(s), or a second one or more further nodes, as one or more T-SNs 306B, based on the slice support information. And the S-SN may transmit, to the MN or a second MN, a SN change required message that identifies the T-SN(s).

Figure 4:
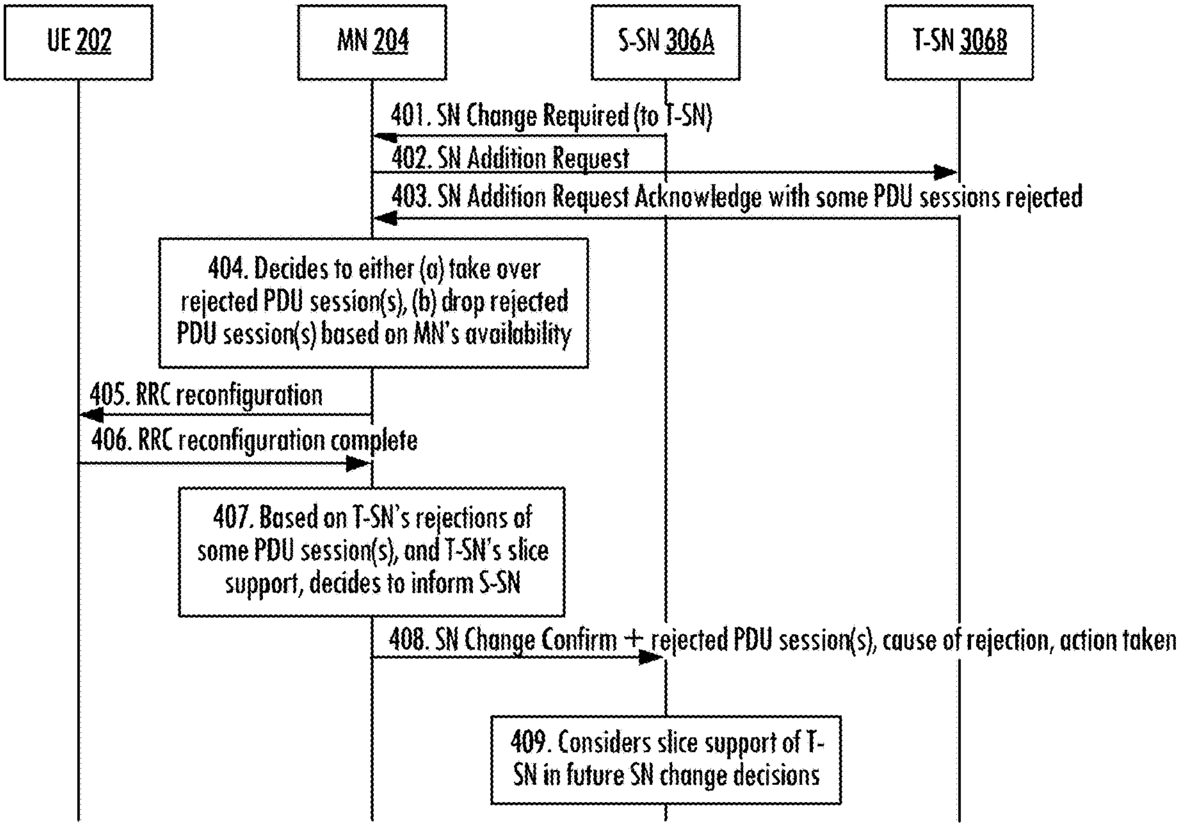
FIGS. 4, 5, 6A and 6B are signaling charts that illustrate a flow of signals or information between a UE, MN, S-SN and T-SN, according to various example implementations.
Figure 5:
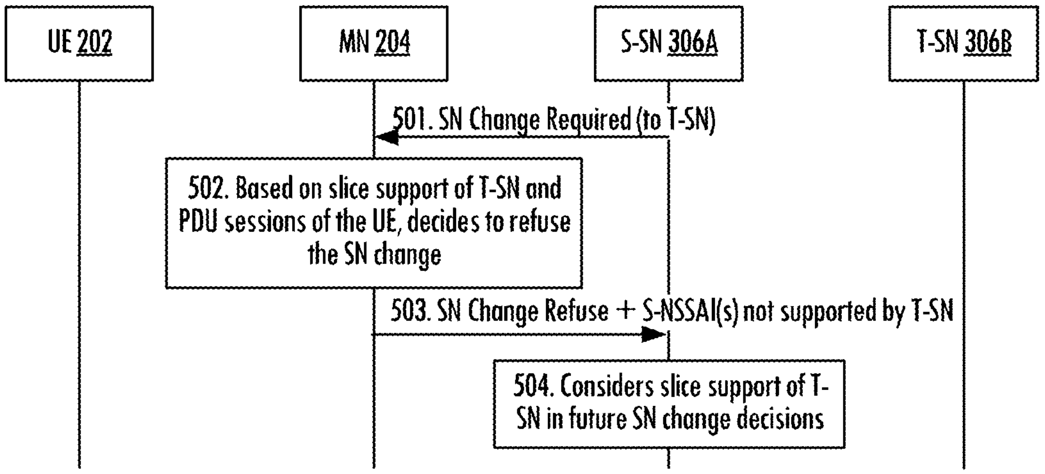

Reference is now made to FIGS. 4, 5, 6A and 6B, which are signaling charts that illustrate a flow of signals or information between a UE 202, MN 204, S-SN 306A and T-SN 306B, according to various example implementations. In this regard, FIGS. 4 and 5 are signaling charts of at least a portion of a SN-initiated SN change procedure, according to some example implementations.

In FIG. 4, the S-SN 306A decides to change the serving PSCell of the UE 202 to a cell served by a T-SN 306B. The S-SN, at step 401, initiates a SN change procedure by sending a SN change required message, which contains an identifier (ID) of the T-SN. At steps 402 and 403, the MN 204 requests the T-SN to allocate resources for the UE by means of an SN addition procedure, and the T-SN accepts the request with some PDU sessions of the UE rejected (not admitted) due to lack of slice support by the T-SN. The MN, at step 404, decides to either take over the rejected PDU sessions (i.e., serve by the MN), or drop the rejected PDU sessions, such as when the MN lacks capacity to serve the rejected PDU sessions.

At steps 405 and 406, the MN 204 triggers the UE 202 to apply a new configuration. The MN may indicate the new configuration to the UE in a MN RRC reconfiguration message including a SN RRC reconfiguration message generated by the T-SN 306B. The UE applies the new configuration and sends a MN RRC reconfiguration complete message. In case the UE is unable to comply with (part of) the configuration included in the MN RRC reconfiguration message, the UE may perform a reconfiguration failure procedure.

At step 407, based on the rejection of at least one PDU session by the T-SN 306B, and knowing that the PDU session(s) is rejected due to a lack of slice support by the T-SN, the MN 204 may decide to provide the S-SN 306A with information about the rejection. At step 408, the MN 204 confirms the change of the S-SN 306A in a SN change confirm message, in which the MN identifies the PDU session(s) rejected by the T-SN. The SN change confirm message may also indicate the cause of the rejection being lack of slice support at the T-SN, and/or an taken action for the PDU session(s) (e.g., taken over by MN, dropped).

Reception of the SN change confirm message may trigger the S-SN 306A to stop providing user data to the UE 202. The S-SN may also consider the slice support of the T-SN 306B in future SN change decisions, as shown at step 409. In particular, for example, the S-SN may not prioritize the T-SN over other possible SNs in case some slices of a UE are not supported by the T-SN. In some examples, further signaling may occur between the MN 204, S-SN and T-SN to complete the SN change procedure, in a manner as described in 3GPP TS 37.340.

In FIG. 5, similar to FIG. 4, the S-SN 306A may decide to change the serving PSCell of the UE 202 to a cell served by a T-SN 306B. The S-SN, at step 501, initiates a SN change procedure by sending a SN change required message, which contains an ID of the T-SN. At step 502, as the MN 204 already knows the slice support of the T-SN, the MN determines that at least one PDU session (or multiple PDU sessions) of the UE 202 cannot be transferred to the T-SN due to lack of slice support. The MN decides to refuse the SN change to the T-SN. At step 503, the MN sends a SN change refuse message to the S-SN. In the SN change refuse message, the MN may include information on network slices that are not supported by the T-SN, such as one or more S-NSSAIs of one or more non-supported slices of the T-SN. At step 504, the S-SN may consider the slice support of the T-SN in future SN change decisions (e.g., the S-SN may not prioritize the T-SN over other possible SNs based on T-SN's slice support).

Figure 6A:
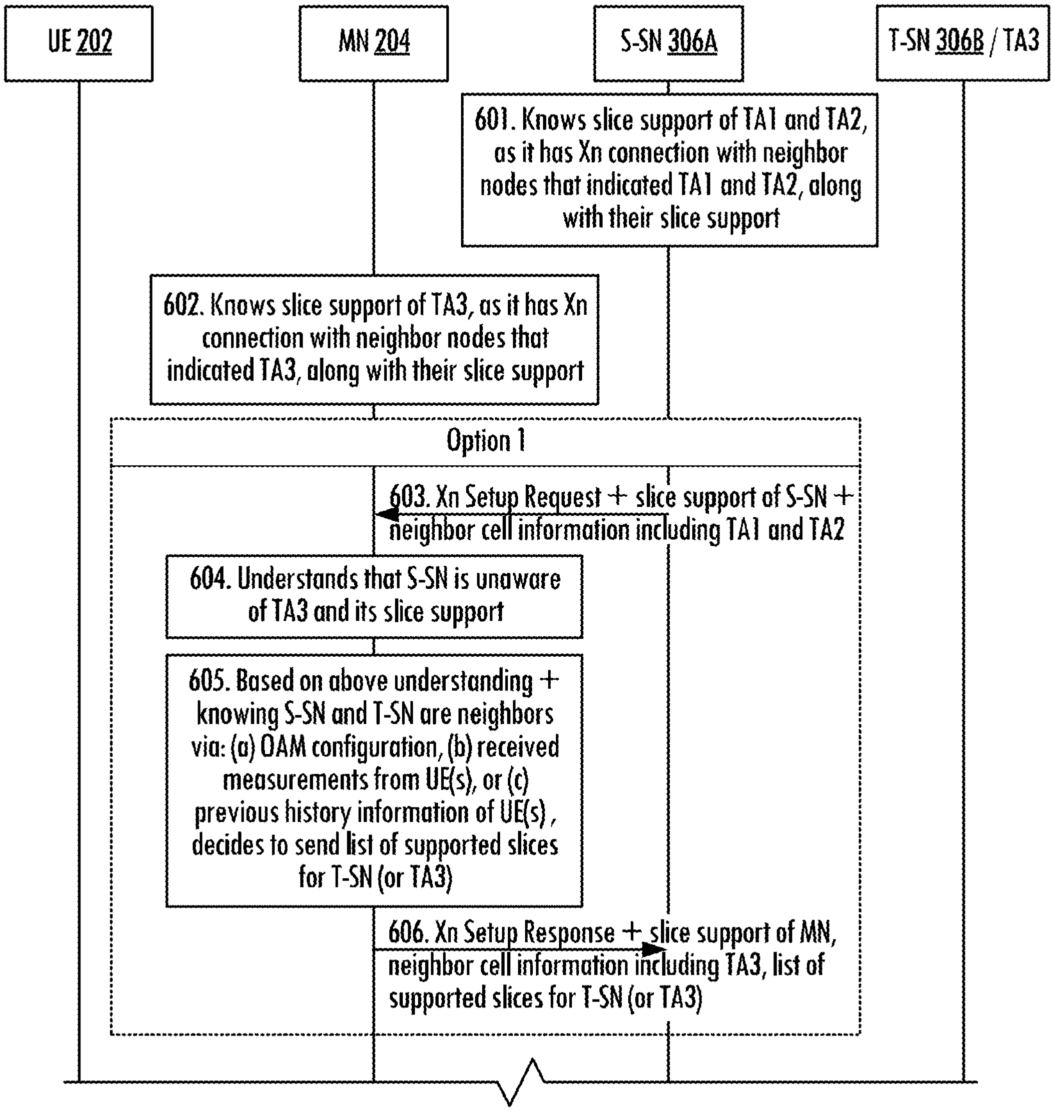
Figure 6B:
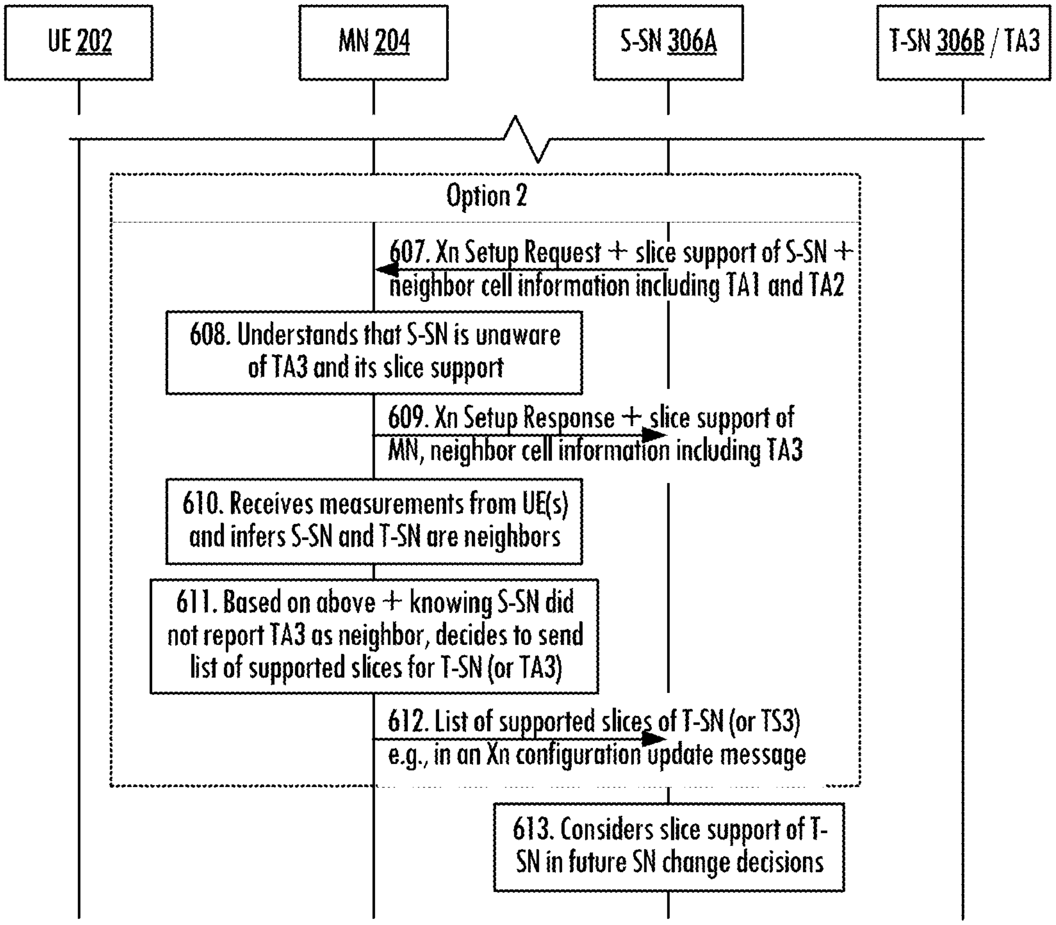

FIGS. 6A and 6B are signaling charts that include an Xn interface setup between the MN 204 and a SN 206 (shown for illustrative purposes as S-SN 306A), according to some example implementations. At step 601 of FIG. 6A, the S-SN knows the slice support of a first TA (TA1) and a second TA (TA2), as the S-SN has some previous Xn connection with neighbor radio access nodes (e.g., gNBs) that indicated TA1 and TA2, including the slice support of TA1 and TA2. Similarly, at step 602, the MN 204 knows the slice support of a third TA (TA3) as the MN has an Xn connection with neighbor radio access nodes that indicated TA3, including the slice support of TA3. And in some examples, TA3 includes a cell served by one or more further nodes 210 (shown for illustrative purposes as T-SN 306B).

In a first option, at step 603, the S-SN 306A initiates an Xn setup procedure by sending an Xn setup request message to the MN 204 (although the Xn setup request message may be sent from the MN to the S-SN). The Xn setup request message includes slice support of the S-SN, and neighbor cell information including TA1 and TA2. At step 604, the MN determines from the neighbor cell information that the S-SN is unaware of TA3 (including T-SN 306B) and its slice support. Based on this, and a second determination that the S-SN and T-SN are neighbors, at step 605, the MN decides to send a list of supported slices of T-SN (or TA3) to the S-SN. As shown, the MN may decide the S-SN and T-SN are neighbors based on at least one of OAM configuration, received measurements from UE(s), or previous history information of UE(s). The MN, at step 606, replies to the Xn setup request message with an Xn setup response message. Similar to the Xn setup request message from the S-SN, the Xn setup response message from the MN includes slice support of the MN, and neighbor cell information including TA3. The Xn setup response message also includes the list of supported slices of T-SN (or TA3).

In a second option, at step 607, shown in FIG. 6B, the S-SN 306A initiates an Xn setup procedure by sending an Xn setup request message to the MN 204 (although the Xn setup request message may be sent from the MN to the S-SN). The Xn setup request message includes slice support of the S-SN, and neighbor cell information including TA1 and TA2. At step 608, the MN determines from the neighbor cell information that the S-SN is unaware of TA3 (including T-SN 306B) and its slice support. At step 609, the MN replies to the Xn setup request message with an Xn setup response message, including slice support of the MN, and neighbor cell information including TA3.

At some later point in time, at step 610, the MN 204 receives measurements from one or more UEs 202 that show the S-SN 306A and T-SN cells may be neighbors (e.g., based on pattern of signal increase/decrease reported by the same UE). The MN infers or otherwise determines that the S-SN and T-SN 306B are neighbors based on the measurements, and knowing the S-SN did not report TA3 as a neighbor, the MN at step 611 decides to send a list of supported slices of T-SN (or TA3) to the S-SN. At step 612, in a message such as an Xn configuration update to the S-SN, the MN includes the list of supported slices of T-SN (or TA3). At step 613, following either the first option or the second option, the S-SN may consider supported slices of T-SN (or TA3) in future SN change decisions (e.g., the S-SN may not prioritize the T-SN over other possible SNs based on T-SN's slice support).

FIGS. 7A-7F are flowcharts that illustrate various operations in a method 700, according to some example implementations. The method includes receiving, at a MN for a UE operating in dual-connectivity with the MN and a SN, information that indicates supported network slices of one or more further nodes (radio access nodes), as shown at block 702 of FIG. 7A. And the method includes transmitting slice support information for the further node(s), from the MN to the SN, based on the information, as shown at block 704. The MN may generate the slice support information (to be transmitted) at least partly based on the received information that indicates supported network slices of one or more further nodes. In an example implementation, the slice support information identifies the supported slices of the further node(s) and/or wherein the slice support information identifies unsupported slices of the further node(s). The slice support information may identify the supported and/or unsupported slices for each of the further node(s) (e.g. node specifically). In an example implementation, the identification of the supported/unsupported slices may be conveyed to the SN by indicating communication session(s) of the UE that is/are associated with supported/unsupported network slices by the further node(s).

In some examples, the information that indicates the supported slices is received at block 702 during setup of a network interface between the MN and respective ones of the further node(s).

Figure 7A:
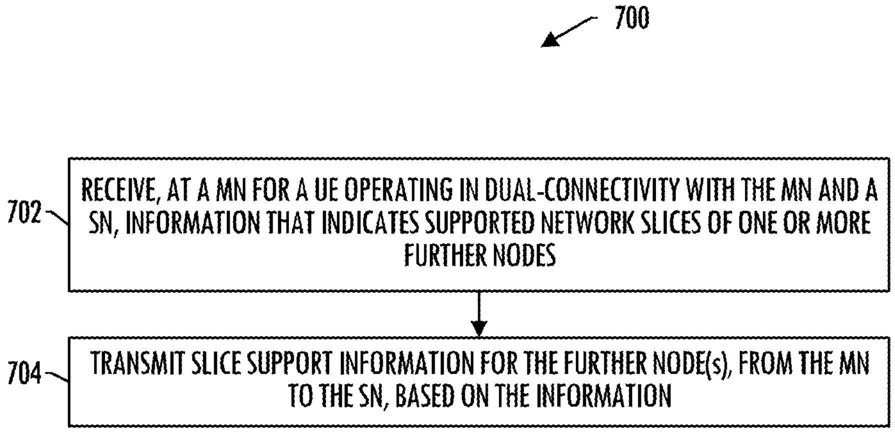
FIGS. 7A, 7B, 7C, 7D, 7E and 7F are flowcharts that illustrate various operations in a method, according to some example implementations.
Figure 7B:

In some examples, the method 700 further includes determining at least one communication session of the UE that is associated with at least one non-supported network slice of the further node(s), based on the supported network slices, as shown at block 706 of FIG. 7B. In some of these examples, the slice support information transmitted at block 704 indicates the non-supported network slice(s).

In some examples, the slice support information is transmitted at block 704 during a SN change procedure in which the secondary node is a S-SN, and the one or more further nodes include one or more T-SNs, of a secondary node change procedure.

Figure 7C:
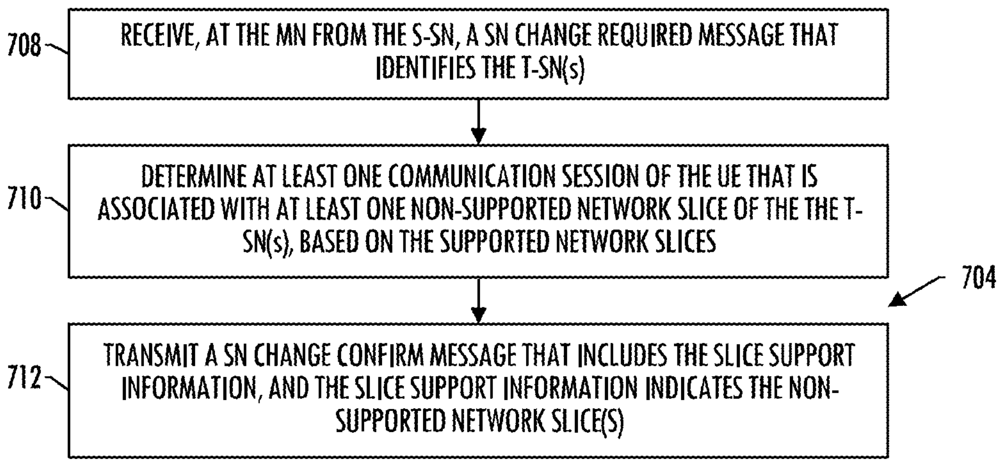

In some examples, the method 700 further includes, during the SN change procedure, receiving, at the MN from the S-SN, a SN change required message that identifies the T-SN(s), as shown at block 708 of FIG. 7C. The method includes determining at least one communication session of the UE that is associated with at least one non-supported network slice of the T-SN(s), based on the supported network slices, as shown at block 710. In some of these examples, transmitting the slice support information at block 704 includes transmitting a SN change confirm message that includes the slice support information, and the slice support information indicates the non-supported network slice(s), as shown at block 712.

Figure 7D:
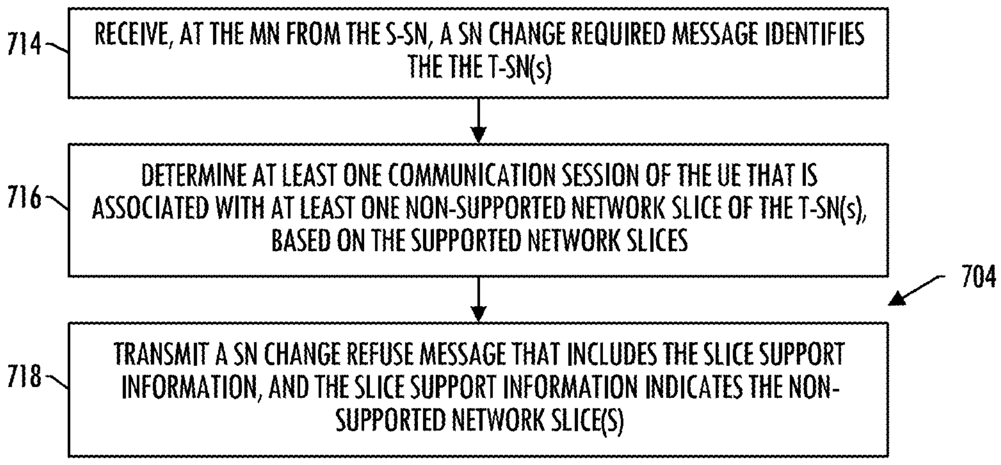

In some examples, the method 700 further includes, during the SN change procedure, receiving, at the MN from the S-SN, a SN change required message identifies the T-SN(s), as shown at block 714 of FIG. 7D. The method includes determining at least one communication session of the UE that is associated with at least one non-supported network slice of the T-SN(s), based on the supported network slices, as shown at block 716. In some of these examples, transmitting the slice support information at block 704 includes transmitting a SN change refuse message that includes the slice support information, and the slice support information indicates the non-supported network slice(s), as shown at block 718.

In some examples, the supported network slices of the further node(s) are the supported network slices of a tracking area of a cell served by the further node(s). In some of these examples, the slice support information indicates the supported network slices. The supported network slices may be indicated by at least one of the further node(s) or the tracking area.

Figure 7E:
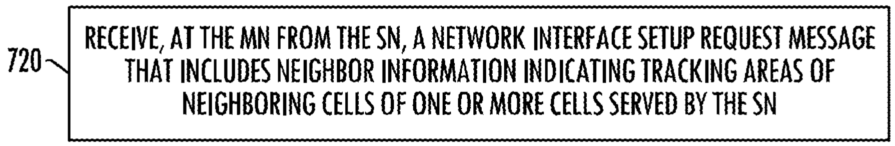
Figure 7F:
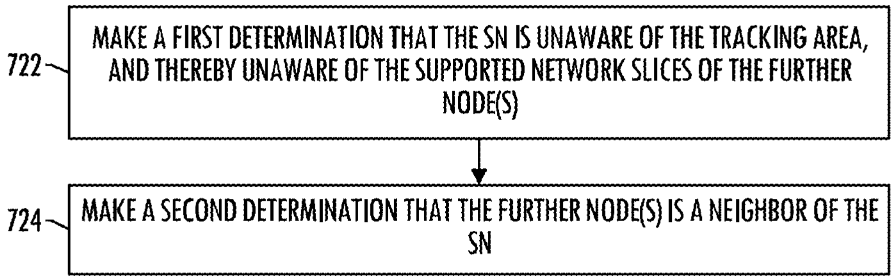

In some examples, the method 700 further includes receiving, at the MN from the SN, a network interface setup request message that includes neighbor cell information indicating tracking areas of neighboring cells of one or more cells served by the SN, as shown at block 720 of FIG. 7E.

In some examples, the method 700 further includes making a first determination that the SN is unaware of the tracking area, and thereby unaware of the supported network slices of the further node(s), as shown at block 722 of FIG. 7E. In some further examples, the first determination is made based on the tracking areas excluding the tracking area of the cell served by the further node(s).

As also shown, the method 700 includes making a second determination that the further node(s) is a neighbor of the SN, as shown at block 724. In some more further examples, the second determination is made at block based on one or more of operations and management (OAM) configuration, measurements received from one or more UEs, or previous history information of the UE(s). The slice support information, then, may be transmitted at block 704 based on the first determination and the second determination. In some examples, the slice support information is transmitted in a network interface setup response message. In other examples, the slice support information is transmitted in a network interface configuration update message.

Figure 8A:
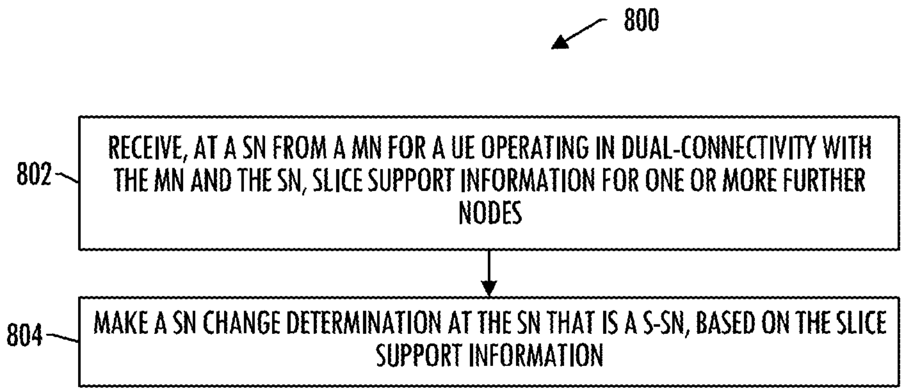
FIGS. 8A and 8B are flowcharts that illustrate various operations in another method, according to some example implementations.
Figure 8B:
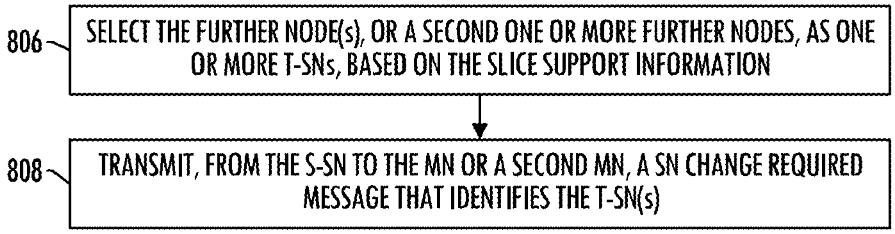

FIGS. 8A and 8B are flowcharts that illustrate various operations in a method 800, according to some example implementations. The method includes receiving, at a SN from a MN for a UE operating in dual-connectivity with the MN and the SN, slice support information for one or more further nodes, as shown at block 802 of FIG. 8A. In some further examples, the slice support information is received during an earlier SN change procedure initiated at the SN, such as in a manner described above. In other examples, the slice support information is received during or in connection with setup of a network interface between the MN and the SN, such as in a network interface setup response message or a network interface configuration update message, as described above.

The method 800 includes making a SN change determination at the SN that is a S-SN, based on the slice support information, as shown at block 804 of FIG. 8A. In some examples, the method further includes, at the SN, during a SN change procedure, selecting the further node(s), or a second one or more further nodes, as one or more T-SNs, based on the slice support information, as shown at block 806 of FIG. 8B. And in some of these examples, the method includes transmitting, from the SN to the MN or a second MN, a SN change required message that identifies the T-SN(s), as shown at block 808.

According to example implementations of the present disclosure, a telecommunications system 100 or PLMN 102, and its components such as a UE 202, MN 204, SN 206, further node 210, S-SN 306A and/or T-SN 306B, may be implemented by various means. Means for implementing the system and its components may include hardware, alone or under direction of one or more computer programs from a computer-readable storage medium, such as computer memory (or more simply "memory"). In some examples, one or more apparatuses may be configured to function as or otherwise implement the system and its components shown and described herein. In examples involving more than one apparatus, the respective apparatuses may be connected to or otherwise in communication with one another in a number of different manners, such as directly or indirectly via a wired or wireless network or the like.

Figure 9:
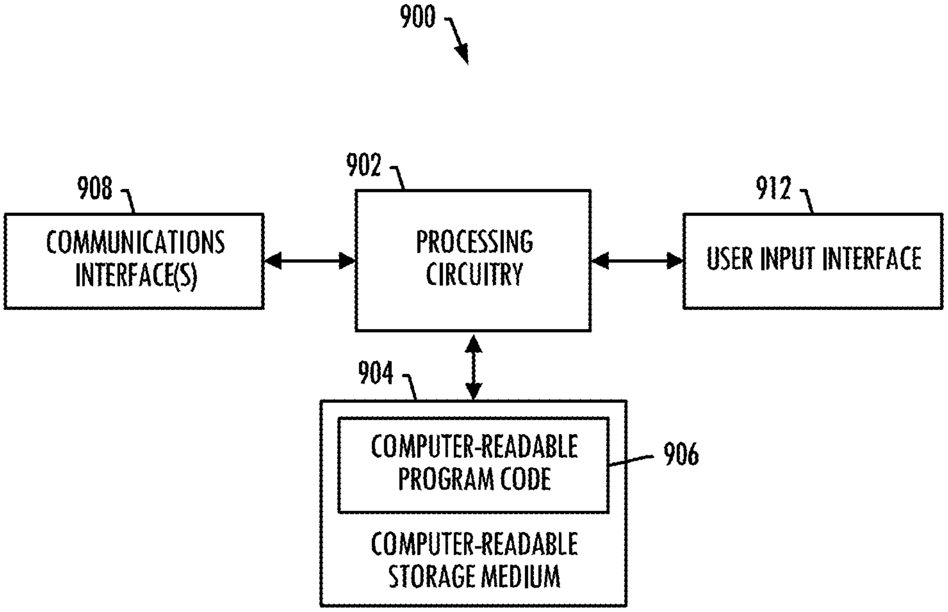
FIG. 9 illustrates an apparatus according to some example implementations.

FIG. 9 illustrates an apparatus 900 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 902 connected to computer-readable storage medium 904.

The processing circuitry 902 may be composed of one or more processors alone or in combination with one or more computer-readable storage media. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the computer-readable storage medium 904 (of the same or another apparatus).

The processing circuitry 902 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The computer-readable storage medium 904 is generally any piece of computer hardware that is capable of storing information such as, for example, data, computer programs (e.g., computer-readable program code 906) and/or other suitable information either on a temporary basis and/or a permanent basis. The computer-readable storage medium may include volatile and/or non-volatile memory, and may be fixed or removable. Examples of suitable memory include random access memory (RAM), read-only memory (ROM), a hard drive, a flash memory, a thumb drive, a removable computer diskette, an optical disk or some combination of the above. The computer-readable storage medium is a non-transitory device capable of storing information, and is distinguishable from computer-readable transmission media such as electronic transitory signals capable of carrying information from one location to another. The term "non-transitory," as used herein, is a limitation of the medium itself (i.e., tangible, not a signal) as opposed to a limitation on data storage persistency (e.g., RAM versus ROM). Computer-readable medium as described herein may generally refer to a computer-readable storage medium or computer-readable transmission medium.

In addition to the computer-readable storage medium 904, the processing circuitry 902 may also be connected to one or more interfaces for displaying, transmitting and/or receiving information. The interfaces may include a communications interface 908 and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

As indicated above, program code instructions may be stored in a computer-readable storage medium, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 900 may include a processing circuitry 902 and a computer-readable storage medium 904 coupled to the processing circuitry, where the processing circuitry is configured to execute computer-readable program code 906 stored in the computer-readable storage medium. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations, as well as those thereafter presented in the appended claims.

Clause 1. An apparatus comprising: at least one memory configured to store computer-readable program code to implement a master node for a user equipment operating in dual-connectivity with the master node and a secondary node; and at least one processing circuitry configured to access the at least one memory, and execute the computer-readable program code to cause the apparatus to at least: receive information that indicates supported network slices of one or more further nodes; and transmit slice support information for the one or more further nodes, to the secondary node, based on the information.

Clause 2. The apparatus of clause 1, wherein the slice support information identifies the supported slices of the one or more further nodes.

Clause 3. The apparatus of clause 1 or clause 2, wherein the at least one processing circuitry is configured to execute the computer-readable program code to cause the apparatus to further determine at least one communication session of the user equipment that is associated with at least one non-supported network slice of the one or more further nodes, based on the supported network slices, and wherein the slice support information identifies at least one of the at least one communication session or the at least one non-supported network slice.

Clause 4. The apparatus of any of clauses 1 to 3, wherein the secondary node is a source secondary node of a secondary node change procedure in which the one or more further nodes include one or more target secondary nodes, and wherein the at least one processing circuitry is configured to execute the computer-readable program code to cause the apparatus to further, during the secondary node change procedure: receive, from the source secondary node, a secondary node change required message that identifies the one or more target secondary nodes; and determine at least one communication session of the user equipment that is associated with at least one non-supported network slice of the one or more target secondary nodes, based on the supported network slices, and wherein the apparatus caused to transmit the slice support information includes the apparatus caused to transmit a secondary node change confirm message or a secondary node change refuse message that includes the slice support information, and the slice support information identifies at least one of the at least one communication session or the at least one non-supported network slice.

Clause 5. The apparatus of clause 4, wherein the secondary node change confirm message is transmitted, and the secondary node change confirm message further indicates at least one of a cause of rejection of the at least one communication session by the one or more target secondary nodes, or an action taken by the apparatus for the at least one communication session.

Clause 6. The apparatus of any of clauses 1 to 5, wherein the supported network slices of the one or more further nodes are the supported network slices of a tracking area of a cell served by the one or more further nodes, and wherein the slice support information indicates the supported network slices.

Clause 7. The apparatus of clause 6, wherein the at least one processing circuitry is configured to execute the computer-readable program code to cause the apparatus to further at least: receive, from the secondary node, a network interface setup request message that includes neighbor cell information indicating tracking areas of neighboring cells of one or more cells served by the secondary node; make a first determination that the secondary node is unaware of the tracking area, and thereby unaware of the supported network slices of the one or more further nodes; and make a second determination that the one or more further nodes is a neighbor of the secondary node, and wherein the slice support information is transmitted based on the first determination and the second determination.

Clause 8. An apparatus comprising: at least one memory configured to store computer-readable program code to implement a secondary node for a user equipment operating in dual-connectivity with a master node and the secondary node; and at least one processing circuitry configured to access the at least one memory, and execute the computer-readable program code to cause the apparatus to at least: receive, from the master node, slice support information for one or more further nodes; and make a secondary node change determination at the secondary node, based on the slice support information.

Clause 9. The apparatus of clause 8, wherein the slice support information identifies supported slices of the one or more further nodes.

Clause 10. The apparatus of clause 8 or clause 9, wherein the slice support information identifies at least one of at least one non-supported network slice of the one or more further nodes, or at least one communication session of the user equipment that is associated with at least one non-supported network slice.

Clause 11. The apparatus of any of clauses 8 to 10, wherein the secondary node is a source secondary node of an earlier secondary node change procedure in which the one or more further nodes include one or more target secondary nodes, and wherein the at least one processing circuitry is configured to execute the computer-readable program code to cause the apparatus to further, during the earlier secondary node change procedure: transmit, to the master node, a secondary node change required message that identifies the one or more target secondary nodes, and wherein the apparatus caused to receive the slice support information includes wherein the apparatus caused to receive a secondary node change confirm message or a secondary node change refuse message that includes the slice support information, and the slice support information identifies at least one of at least one non-supported network slice of the one or more target secondary nodes, or at least one communication session of the user equipment that is associated with the at least one non-supported network slice.

Clause 12. The apparatus of clause 11, wherein the secondary node change confirm message is received, and the secondary node change confirm message further indicates at least one of a cause of rejection of the at least one communication session by the one or more target secondary nodes, or an action taken by the master node for the at least one communication session.

Clause 13. The apparatus of any of clauses 8 to 12, wherein the supported network slices of the one or more further nodes are the supported network slices of a tracking area of a cell served by the one or more further nodes, and wherein the slice support information indicates the supported network slices.

Clause 14. The apparatus of clause 13, wherein the at least one processing circuitry is configured to execute the computer-readable program code to cause the apparatus to further at least: transmit, to the master node, a network interface setup request message that includes neighbor cell information indicating tracking areas of neighboring cells of one or more cells served by the secondary node, and the tracking areas exclude the tracking area of the cell served by the one or more further nodes, and wherein the apparatus caused to receive the slice support information includes the apparatus caused to receive a network interface setup response message or a network interface configuration update message that includes the apparatus caused to the slice support information.

Clause 15. A method comprising: receiving, at a master node for a user equipment operating in dual-connectivity with the master node and a secondary node, information that indicates supported network slices of one or more further nodes; and transmitting slice support information for the one or more further nodes, from the master node to the secondary node, based on the information.

Clause 16. The method of clause 15, wherein the slice support information identifies the supported slices of the one or more further nodes.

Clause 17. The method of clause 15 or clause 16, wherein the method further comprises determining at least one communication session of the user equipment that is associated with at least one non-supported network slice of the one or more further nodes, based on the supported network slices, and wherein the slice support information identifies at least one of the at least one communication session or the at least one non-supported network slice.

Clause 18. The method of any of clauses 15 to 17, wherein the secondary node is a source secondary node of a secondary node change procedure in which the one or more further nodes include one or more target secondary nodes, and wherein the method further comprises during the secondary node change procedure: receiving, at the master node from the source secondary node, a secondary node change required message that identifies the one or more target secondary nodes; and determining at least one communication session of the user equipment that is associated with at least one non-supported network slice of the one or more target secondary nodes, based on the supported network slices, and transmitting the slice support information includes transmitting a secondary node change confirm message or a secondary node change refuse message that includes the slice support information, and the slice support information identifies at least one of the at least one communication session or the at least one non-supported network slice.

Clause 19. The method of clause 18, wherein the secondary node change confirm message is transmitted, and the secondary node change confirm message further indicates at least one of a cause of rejection of the at least one communication session by the one or more target secondary nodes, or an action taken by the master node for the at least one communication session.

Clause 20. The method of any of clauses 15 to 19, wherein the supported network slices of the one or more further nodes are the supported network slices of a tracking area of a cell served by the one or more further nodes, and wherein the slice support information indicates the supported network slices.

Clause 21. The method of clause 20, wherein the method further comprises: receiving, at the master node from the secondary node, a network interface setup request message that includes neighbor cell information indicating tracking areas of neighboring cells of one or more cells served by the secondary node; making a first determination that the secondary node is unaware of the tracking area, and thereby unaware of the supported network slices of the one or more further nodes; and making a second determination that the one or more further nodes is a neighbor of the secondary node, and wherein the slice support information is transmitted based on the first determination and the second determination.

Clause 22. A method comprising: receiving, at a secondary node from a master node for a user equipment operating in dual-connectivity with the master node and the secondary node, slice support information for one or more further nodes; and making a secondary node change determination at the secondary node, based on the slice support information.

Clause 23. The method of clause 22, wherein the slice support information identifies supported slices of the one or more further nodes.

Clause 24. The method of clause 22 or clause 23, wherein the slice support information identifies at least one of at least one non-supported network slice of the one or more further nodes, or at least one communication session of the user equipment that is associated with at least one non-supported network slice.

Clause 25. The method of any of clauses 22 to 24, wherein the secondary node is a source secondary node of a secondary node change procedure in which the one or more further nodes include one or more target secondary nodes, and wherein the method further comprises during the earlier secondary node change procedure: transmitting, from the source secondary node to the master node, a secondary node change required message that identifies the one or more target secondary nodes, and receiving the slice support information includes receiving a secondary node change confirm message or a secondary node change refuse message that includes the slice support information, and the slice support information identifies at least one of at least one non-supported network slice of the one or more target secondary nodes, or at least one communication session of the user equipment that is associated with the at least one non-supported network slice.

Clause 26. The method of clause 25, wherein the secondary node change confirm message is received, and the secondary node change confirm message further indicates at least one of a cause of rejection of the at least one communication session by the one or more target secondary nodes, or an action taken by the master node for the at least one communication session.

Clause 27. The method of any of clauses 22 to 26, wherein the supported network slices of the one or more further nodes are the supported network slices of a tracking area of a cell served by the one or more further nodes, and wherein the slice support information indicates the supported network slices.

Clause 28. The method of clause 27, wherein the method further comprises: transmitting, from the secondary node to the master node, a network interface setup request message that includes neighbor cell information indicating tracking areas of neighboring cells of one or more cells served by the secondary node, and the tracking areas exclude the tracking area of the cell served by the one or more further nodes, and receiving the slice support information includes receiving a network interface setup response message or a network interface configuration update message that includes the slice support information.

Clause 29. An apparatus comprising means for performing the method of any of clauses 15 to 21.

Clause 30. A computer-readable medium comprising computer-readable program code that, in response to execution by at least one processing circuitry, causes an apparatus to perform the method of any of clauses 15 to 21.

Clause 31. A computer-readable storage medium comprising computer-readable program code that, in response to execution by at least one processing circuitry, causes an apparatus to perform the method of any of clauses 15 to 21.

Clause 32. A computer program comprising computer-readable program code that, in response to execution by at least one processing circuitry, causes an apparatus to perform the method of any of clauses 15 to 21.

Clause 33. An apparatus comprising means for performing the method of any of clauses 22 to 28.

Clause 34. A computer-readable medium comprising computer-readable program code that, in response to execution by at least one processing circuitry, causes an apparatus to perform the method of any of clauses 22 to 28.

Clause 35. A computer-readable storage medium comprising computer-readable program code that, in response to execution by at least one processing circuitry, causes an apparatus to perform the method of any of clauses 22 to 28.

Clause 36. A computer program comprising computer-readable program code that, in response to execution by at least one processing circuitry, causes an apparatus to perform the method of any of clauses 22 to 28.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus comprising:

a master node;

a processor; and a memory comprising computer-executable instructions that, when executed by the processor, cause the apparatus to perform the following operations:

receive, by the master node for a user equipment operating in dual-connectivity with the master node and a secondary node, a secondary node change required message from the secondary node that identifies one or more target secondary nodes, wherein the secondary node is a source secondary node of the secondary node change procedure in which the one or more further nodes include the one or more target secondary nodes receive, information that indicates supported network slices of the one or more further nodes;

determine at least one communication session of the user equipment that is associated with at least one non-supported network slice of the one or more further nodes, based on the supported network slices;

receive, at the master node from the secondary node, a network interface setup request message that includes neighbor cell information indicating tracking areas of neighboring cells of one or more cells served by the secondary node;

make a first determination that the secondary node is unaware of the tracking area, and thereby unaware of the supported network slices of the one or more further nodes; and make a second determination that the one or more further nodes is a neighbor of the secondary node; and transmit, based on the first determination and the second determination, slice support information for the one or more further nodes from the master node to the secondary node, wherein the slice support information identifies the supported slices of the one or more further nodes, wherein the slice support information identifies the at least one communication session and the at least one non-supported network slice, and wherein transmitting the slice support information further includes transmitting a secondary node change confirm message that includes the slice support information, wherein the secondary node change confirm message further indicates at least one of a cause of rejection of the at least one communication session by the one or more target secondary nodes, or an action taken by the apparatus for the at least one communication session.

2. The apparatus of claim 1, wherein the supported network slices of the one or more further nodes are the supported network slices of a tracking area of a cell served by the one or more further nodes, and wherein the slice support information indicates the supported network slices.

3. The apparatus of claim 2, wherein the supported network slices are end-to-end logical networks that support a certain set of network functions.

4. The apparatus of claim 3, wherein the supported network slices are logical network infrastructures that provide specific network capabilities and network characteristics.

5. The apparatus of claim 4, wherein the secondary node is a radio access node.

6. The apparatus of claim 5, wherein the slice support information is transmitted in a network interface setup response message.

7. The apparatus of claim 5, wherein the the slice support information is transmitted in a network interface configuration update message.

8. A system comprising:

an apparatus comprising:

a master node;

a processor; and a memory comprising computer-executable instructions that, when executed by the processor, cause the apparatus to perform the following operations:

receive, by the master node for a user equipment operating in dual-connectivity with the master node and a secondary node, a secondary node change required message from the secondary node that identifies one or more target secondary nodes, wherein the secondary node is a source secondary node of the secondary node change procedure in which the one or more further nodes include the one or more target secondary nodes receive, information that indicates supported network slices of the one or more further nodes;

determine at least one communication session of the user equipment that is associated with at least one non-supported network slice of the one or more further nodes, based on the supported network slices;

receive, at the master node from the secondary node, a network interface setup request message that includes neighbor cell information indicating tracking areas of neighboring cells of one or more cells served by the secondary node;

make a first determination that the secondary node is unaware of the tracking area, and thereby unaware of the supported network slices of the one or more further nodes; and make a second determination that the one or more further nodes is a neighbor of the secondary node; and transmit, based on the first determination and the second determination, slice support information for the one or more further nodes from the master node to the secondary node, wherein the slice support information identifies the supported slices of the one or more further nodes, wherein the slice support information identifies the at least one communication session and the at least one non-supported network slice, and wherein transmitting the slice support information further includes transmitting a secondary node change confirm message that includes the slice support information, wherein the secondary node change confirm message further indicates at least one of a cause of rejection of the at least one communication session by the one or more target secondary nodes, or an action taken by the apparatus for the at least one communication session.

9. The system of claim 8, wherein the supported network slices of the one or more further nodes are the supported network slices of a tracking area of a cell served by the one or more further nodes, and wherein the slice support information indicates the supported network slices.

10. The system of claim 9, wherein the supported network slices are end-to-end logical networks that support a certain set of network functions.

11. The system of claim 10, wherein the supported network slices are logical network infrastructures that provide specific network capabilities and network characteristics.

12. The system of claim 11, wherein the secondary node is a radio access node.

13. The system of claim 12, wherein the slice support information is transmitted in a network interface setup response message.

14. The system of claim 12, wherein the the slice support information is transmitted in a network interface configuration update message.

15. A method comprising:

receiving, by a master node for a user equipment operating in dual-connectivity with the master node and a secondary node, a secondary node change required message from the secondary node that identifies one or more target secondary nodes, wherein the secondary node is a source secondary node of the secondary node change procedure in which the one or more further nodes include the one or more target secondary nodes receiving, information that indicates supported network slices of the one or more further nodes;

determining at least one communication session of the user equipment that is associated with at least one non-supported network slice of the one or more further nodes, based on the supported network slices;

receiving, at the master node from the secondary node, a network interface setup request message that includes neighbor cell information indicating tracking areas of neighboring cells of one or more cells served by the secondary node;

making a first determination that the secondary node is unaware of the tracking area, and thereby unaware of the supported network slices of the one or more further nodes; and making a second determination that the one or more further nodes is a neighbor of the secondary node; and transmitting, based on the first determination and the second determination, slice support information for the one or more further nodes from the master node to the secondary node, wherein the slice support information identifies the supported slices of the one or more further nodes, wherein the slice support information identifies the at least one communication session and the at least one non-supported network slice, and wherein transmitting the slice support information further includes transmitting a secondary node change confirm message that includes the slice support information, wherein the secondary node change confirm message further indicates at least one of a cause of rejection of the at least one communication session by the one or more target secondary nodes, or an action taken by the apparatus for the at least one communication session.

16. The method of claim 15, wherein the supported network slices of the one or more further nodes are the supported network slices of a tracking area of a cell served by the one or more further nodes, and wherein the slice support information indicates the supported network slices.

17. The method of claim 16, wherein the supported network slices are end-to-end logical networks that support a certain set of network functions.

18. The method of claim 17, wherein the supported network slices are logical network infrastructures that provide specific network capabilities and network characteristics.

19. The method of claim 18, wherein the secondary node is a radio access node.

20. The method of claim 19, wherein the slice support information is transmitted in a network interface setup response message, or wherein the the slice support information is transmitted in a network interface configuration update message.

* * * * *